United States Patent [19]

Fukushima et al.

[11] 4,456,213
[45] Jun. 26, 1984

[54] ENGINE MOUNTING STRUCTURE

[75] Inventors: Masao Fukushima, Fuchu; Komei Yazaki, Yokohama, both of Japan

[73] Assignee: Nissan Motor Company, Limited, Yokohama, Japan

[21] Appl. No.: 301,018

[22] Filed: Sep. 10, 1981

[30] Foreign Application Priority Data

Sep. 24, 1980 [JP] Japan .................... 55-135710[U]

[51] Int. Cl.³ .................................... F16M 13/00
[52] U.S. Cl. ................................. 248/559; 248/659
[58] Field of Search ................ 248/559, 659, 605; 267/140.1; 180/300, 312, 291

[56] References Cited

U.S. PATENT DOCUMENTS 3,445,080 5/1969 Flannelly .................. 267/140.1 X

FOREIGN PATENT DOCUMENTS 2632574 1/1978 Fed. Rep. of Germany ...... 248/559
2722500 2/1978 Fed. Rep. of Germany .
2431639 2/1980 France .
2444852 7/1980 France .
1026358 4/1966 United Kingdom ................ 248/559

Primary Examiner—J. Franklin Foss

[57] ABSTRACT

An engine mounting structure for mounting an automotive engine on the body structure of an automotive vehicle, comprising two rigid coupling members one of which is connected to the vehicle body structure and the other of which is connected to the body structure of the engine, two resilient blocks securely attached to the coupling members, respectively, and having interposed therebetween an intermediate member carrying an inertia member at the free end of the intermediate member, and a resilient block interposed between the intermediate member and one of the two coupling members, wherein the spring constants of the three resilient blocks, the weight of the inertia member and the location of the third resilient block on the intermediate member are selected, by preference, in such a manner as to reduce the vibrations to be transmitted from the engine to the vehicle body during cruising of the vehicle at relatively high speeds.

7 Claims, 11 Drawing Figures

4,456,213

ENGINE MOUNTING STRUCTURE

FIELD OF THE INVENTION

The present invention relates to an engine mounting structure used for the mounting of an engine on the body structure of an automotive vehicle.

SUMMARY OF THE INVENTION

In accordance with the present invention, there is provided an engine mounting structure for mounting an automotive engine on the body structure of an automotive vehicle, comprising at least one shock and vibration insulating unit which comprises, a first coupling member to be connected to the body structure of the vehicle, a second coupling member to be connected to the body structure of the engine, a first resilient block securely attached to the first coupling member, a second resilient block securely attached to the second coupling member, an intermediate member securely interposed between the first and second resilient blocks and extending from between the first and second resilient blocks, an inertia member carried on the intermediate member at a free end of the intermediate member, and a third resilient block securely interposed between the intermediate member and one of the first and second coupling members. The first and second coupling members may be hollow and cylindrical and be respectively spaced apart inwardly and outwardly from each other, the first resilient block being securely attached to the outer peripheral surface of the first coupling member, the second resilient block being securely attached to the inner peripheral surface of the second coupling member, the third resilient block being securely interposed between the intermediate member and one of the outer peripheral surface of the first coupling member and the inner peripheral surface of the second coupling member. In this instance, the first resilient block may constitute each of a pair of such resilient blocks positioned in diametrically opposite relationship to each other across the first coupling member and, furthermore, the second resilient block may constitute each of a pair of such resilient blocks, wherein each of the resilient blocks each constituting said first resilient block and each of the resilient blocks each constituting the second resilient block have interposed therebetween the intermediate member which constitutes each of such members, the third resilient block constituting each of such blocks.

BRIEF DESCRIPTION OF THE DRAWINGS

The drawbacks of prior-art engine mounting structures and the detailed features and advantages of an engine mounting structure according to the present invention will be understood from the following description taken in conjunction with the following drawings in which like reference numerals designate similar to corresponding members, units and structures and in which.

DESCRIPTION OF THE PRIOR ART

Figure 1:
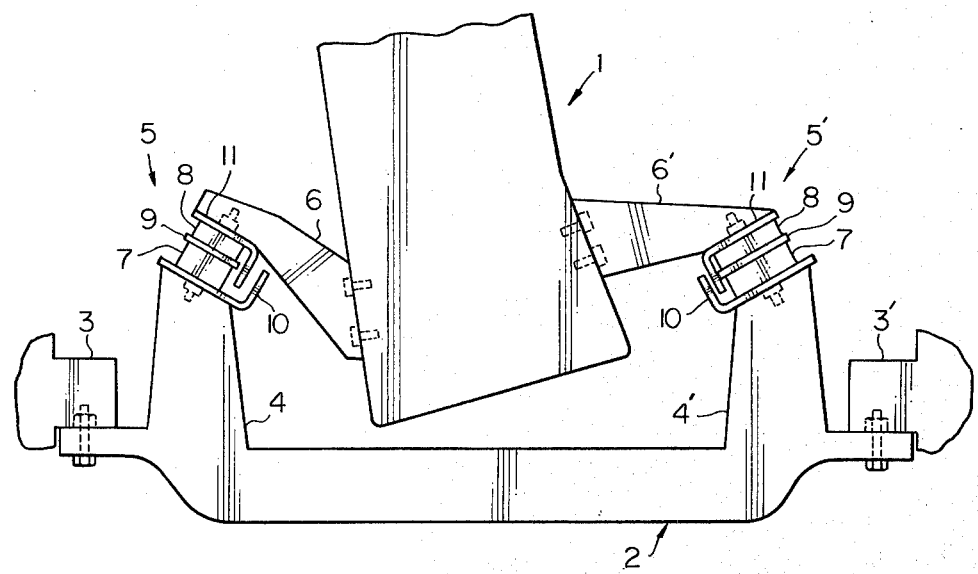
FIG. 1 is a fragmentary front elevation view showing a representative example of a prior-art engine mounting structure.
Figure 2:
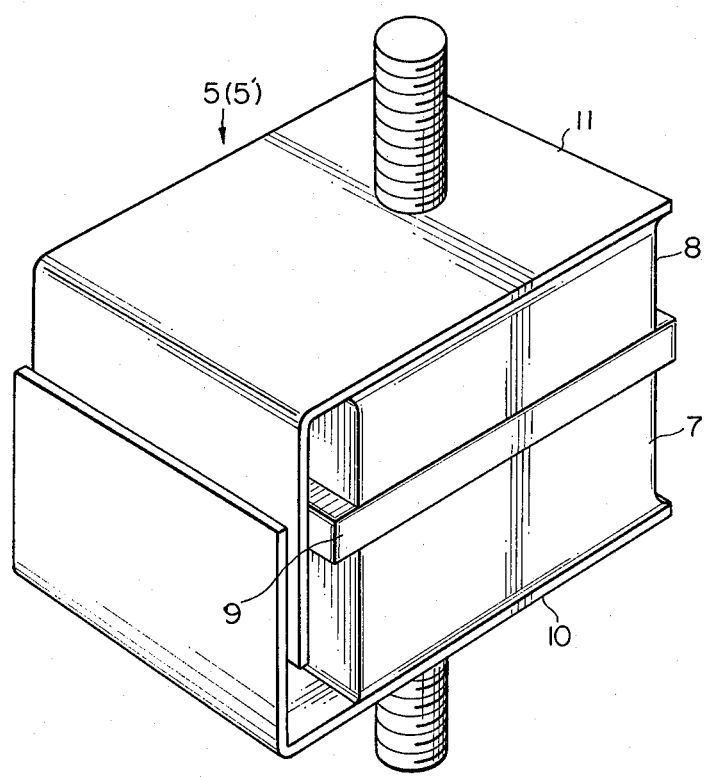
FIG. 2 is a perspective view showing, to an enlarged scale, a shock and vibration insulating unit forming part of the prior-art engine mounting structure illustrated in FIG. 1.

For better understanding of the features and advantages of an engine mounting structure according to the present invention, description will be hereinafter made with reference to FIGS. 1 and 2 which show a representative example of a known engine mounting structure. The engine mounting structure as shown is used for the mounting of an internal combustion engine 1 on a lateral suspension member 2 of the body structure of an automotive vehicle. The lateral suspension member 2 extends laterally of the vehicle body structure and is fixedly connected adjacent the opposite lateral ends thereof to right and left side members 3 and 3' of the vehicle body structure. The suspension member 2 thus bridging the side members 3 and 3' has a pair of upstanding bracket portions 4 and 4' positioned on both sides of the engine 1 and adjacent to the side members 3 and 3' respectively.

The prior-art engine mounting structure comprises a pair of shock and vibration insulating units 5 and 5' each of which is connected between each of the bracket portions 4 and 4' of the suspension member 2 and each of engine-side bracket members 6 and 6', respectively, which are secured to the body structure of the engine 1. More specifically, each of the shock and vibration insulating unit 5 and 5' comprises lower and upper resilient blocks 7 and 8, and intermediate rigid member 9 securely interposed between the resilient blocks 7 and 8. The lower resilient block 7 is securely attached to a lower coupling member 10 fixedly connected to the bracket portion 4 of the lateral suspension member 2. The upper resilient block 8 is securely attached to an upper coupling member 11 which is fixed to the bracket member 6 secured to the body structure of the engine 1.

Each of the resilient blocks 7 and 8 in the prior-art engine mounting structure thus constructed is formed of a resilient material such as rubber having a relatively large spring constant so that each of the shock and vibration insulating units 5 and 5' is capable of dampening the shocks and vibrations to be produced under medium-speed cruising conditions of the vehicle. Thus, the shock and vibration insulating units 5 and 5' are not suitable for dampening the shocks and vibrations to be produced under high-speed cruising conditions of the vehicle. The vibrations produced during high-speed cruising of a vehicle are causative of production of stifled booming noises in the vehicle cabin. In order to eliminate such low-frequency noises, the resilient blocks 7 and 8 are required to have such weights that are large enough to absorb the vibrations to be produced by the engine under high-speed cruising conditions of the vehicle. The provision of such heavy resilient blocks results in unwieldy construction of the engine mounting structure as a whole and requires an additional space and additional time and labor for the installation of the engine and engine mounting structure on the vehicle body.

DESCRIPTION OF THE EMBODIMENTS

Figure 3:
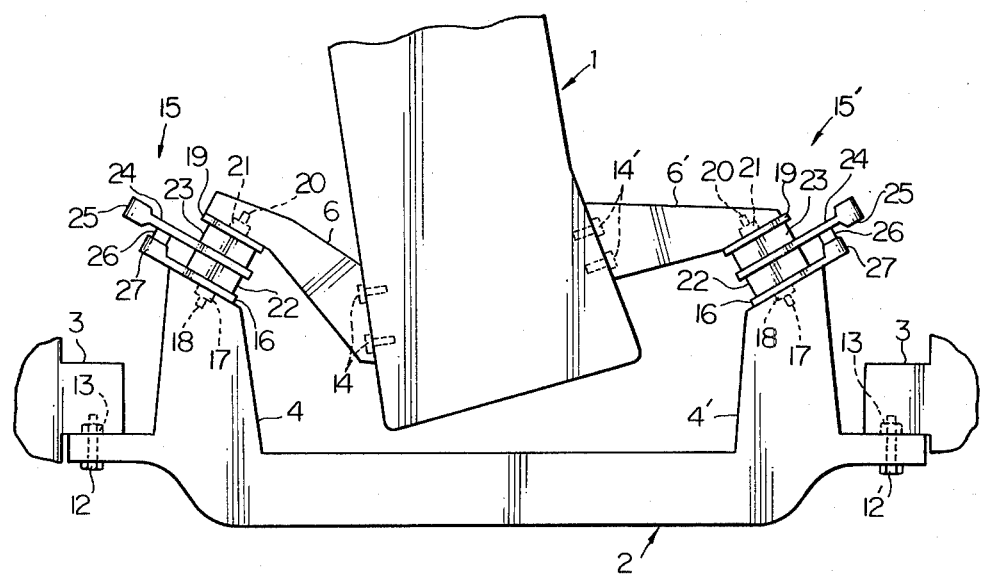
FIG. 3 is a fragmentary front elevation view showing a first preferred embodiment of the engine mounting structure according to the present invention.
Figure 4:
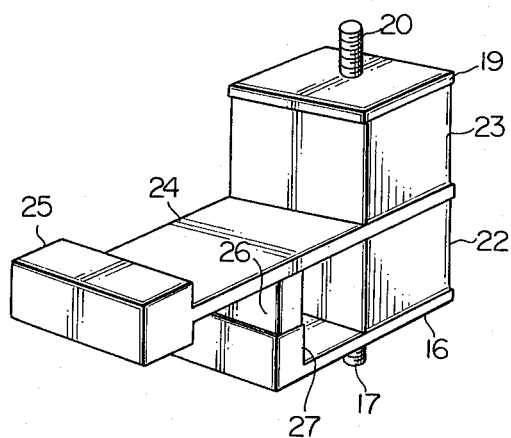
FIG. 4 is a perspective view showing, to an enlarged scale, a shock and vibration insulating unit forming part of the embodiment illustrated in FIG. 3.
Figure 5:
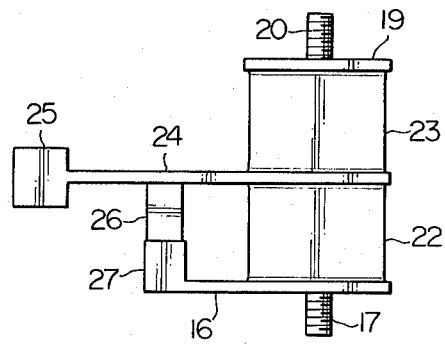
FIG. 5 is a front end view of the shock and vibration insulating unit shown in FIG. 4.

FIGS. 3 to 5 of the drawings shows a first preferred embodiment of the engine mounting structure according to the present invention aiming at provision of such solutions.

Referring first to FIG. 3, the engine mounting structure embodying the present invention is used for the mounting of an automotive internal combustion engine 1 on a suitable lateral support member such as a front suspension member 2 of the body structure of an automotive vehicle. The lateral suspension member 2 extends laterally of the vehicle body structure and is fixedly connected adjacent the lateral ends thereof to right and left side members 3 and 3' of the body structure by suitable fastening means such as bolts 12 and 12' and nuts 13 and 13', respectively. The lateral suspension member 2 thus bridging the side members 3 and 3' of the vehicle body structure has a pair of upstanding bracket portions 4 and 4' positioned on both sides of the engine 1 and adjacent to the side member 3 and 3', respectively. Each of the bracket portions 4 and 4' has an upper end face which is slightly inclined toward the engine 1.

A pair of rigid engine-side bracket members 6 and 6' are bolted as at 14 and 14' or otherwise securely connected to the body structure of the engine 1. Each of the bracket members 6 and 6' has a lower face spaced apart substantially in parallel from the inclined upper end face of each of the bracket portions 4 and 4' of the lateral suspension member 2.

The engine mounting structure shown in FIG. 3 further comprises a pair of shock and vibration insulating units 15 and 15' provided on both sides of the engine 1. Each of the shock and vibration insulating units 15 and 15' comprises a rigid first coupling member 16 securely attached to the inclined upper end face of the bracket portion 4 of the suspension member 2 by suitable fastening means such as a bolt 17 welded to the coupling member 16 and secured to the bracket portion 4 by means of a nut 18. The shock and vibration insulating unit 15 further comprises a rigid second coupling member 19 securely attached to the inclined lower face of the engine-side bracket member 6 by suitable fastening means such as a bolt 20 welded to the coupling member 19 and secured to the bracket member 6 by means of a nut 21.

As will be better seen from FIGS. 4 and 5 of the drawings, each of the shock and vibration insulating units 15 and 15' further comprises first and second resilient blocks 22 and 23 each having substantially parallel opposite end faces, one of the opposite end faces of the first resilient block 22 being bonded or otherwise securely attached to the first coupling member 16. Likewise, the second resilient block 23 has one of its opposite end faces bonded or otherwise securely attached to the second coupling member 19. The first and second resilient blocks 22 and 23 have interposed therebetween a rigid intermediate member 24 which is bonded or otherwise securely attached to the other end faced of the first and second resilient blocks 22 and 23, respectively.

Each of the resilient blocks 22 and 23 is constructed of a resilient material such as rubber having a predetermined spring constant $k_1$ (load rate) preferably ranging between about 30 kgs/mm and about 80 kgs/mm.

The intermediate member 24 of each of the shock and vibration insulation units 15 and 15' laterally extends from between the resilient blocks 22 and 23 and has an inertia member 25 at the free end thereof. The inertia member 25 may be integral with the intermediate member 24 or may be constructed separately of and securely coupled to the intermediate member 24. Furthermore, the intermediate member 24 is connected to one of the first and second coupling members such as the first coupling member 16 by a third resilient block 26. For this purpose, the first coupling member 16 may be formed with a lug portion 27 projecting perpendicularly toward the intermediate member 24 so that the third resilient block 26 is securely interposed between the intermediate member 24 and the lug portion 27 of the first coupling member 16 as shown.

Figure 6:
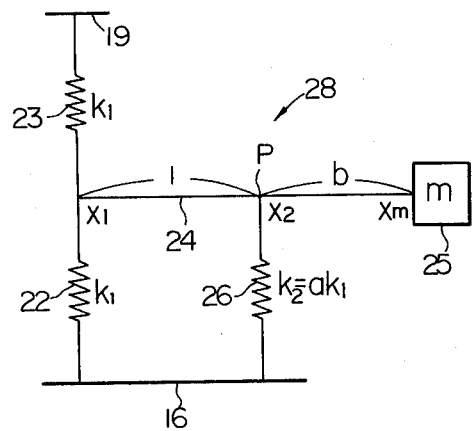
FIG. 6 is a diagram showing, in a modelled form, the oscillatory system constituted by the shock and vibration insulating unit illustrated in FIGS. 4 and 5.

The inertia member 25 of each of the shock and vibration insulating units 15 and 15' has a predetermined mass m which is preferably selected to fall within the range of about 0.1 kg and about 1.0 kg on a weight basis. The third resilient block 26 of each of the shock and vibration insulating units 15 and 15' has a predetermined spring constant $k_2$ (load rate) which is preferably a times the spring constant $k_1$ of each of the first and second resilient blocks 22 and 23. The parameter a ranges from about 1 to about 10. Furthermore, the third resilient block 26 is attached to the intermediate member 24 at a point dividing the length of the intermediate member 24 in the ratio of 1:b from the end of the intermediate member 24 opposite to the inertia member 25, wherein the value of the parameter b is selected from the range of between about 0.1 and 2.0. Thus, each of the shock and vibration insulating units 15 and 15' constructed and arranged as hereinbefore described constitutes an oscillatory system 28 shown in FIG. 6.

When, in operation, the vehicle is cruising at relatively high speeds, booming noises tend to be produced in the vehicle compartment due to the vibrations transmitted from the engine to the vehicle body at frequencies of 90 to 140 Hz. If, under these conditions, the above mentioned oscillatory system 28 is subjected to oscillations with the amount of displacement x at the exciting frequency f and the angular velocity, then the resulting equation for the equilibrium of forces is expressed as $$k_1(2x_1 + a \cdot x_2 - x) - \omega^2 \cdot m \cdot x_m = 0,$$

where $x_1$ is the displacement of the intermediate member 24 at its end opposite to the inertia member 25, $x_2$ is the displacement of the intermediate member 24 at the point (indicated at P in FIG. 6) dividing the length of the intermediate member 24 in the ratio of 1:b from the end of the member 24 opposite to the inertia member 25, and $x_m$ is the displacement of the inertia member 25.

Furthermore, the equation for the equilibrium of moments in the oscillatory system 28 is written in the form $$k_1(2x_1 - x) = -b \cdot \omega^2 \cdot m \cdot x_m$$

On the other hand, the following relationship holds among the displacements $x_1$, $x_2$ and $x_m$:

$$(1+b)x_2 = b \cdot x_1 + x_m$$

From the above equations, the force F transmitted from the second coupling member 19 to the first coupling member 16, viz., from the engine 1 to the vehicle body structure is given as $$F = k_1 \cdot x_1 + a \cdot k_1 \cdot x_2$$
$$= \frac{\{a \cdot b(1+b) + (1+b)^2\} m \cdot \omega^2 - a \cdot k_1}{\{2(1+b)^2 + a \cdot b^2\} m \cdot \omega^2 - 2a \cdot k_1}$$

Figure 7:
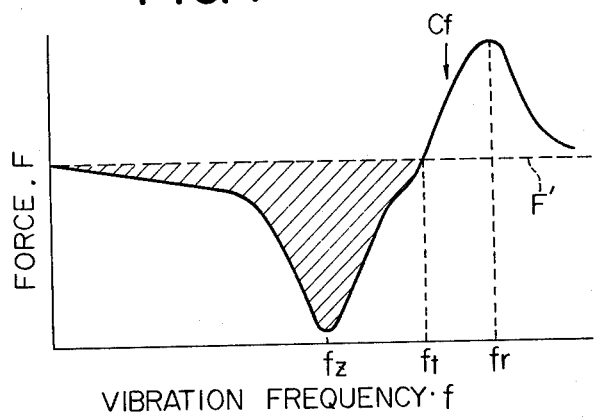
FIG. 7 is a graph showing the relationship between the frequency of vibrations transmitted to the oscillatory system illustrated in FIG. 6 and the force to be transmitted from the engine to the vehicle body structure through the oscillatory system.
Figure 8:
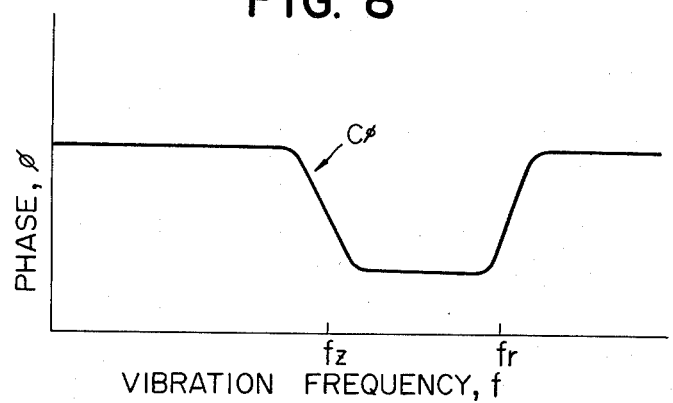
FIG. 8 is a graph showing the relationship between the frequency of vibrations transmitted to the oscillatory system illustrated in FIG. 6 and the phase of the force to be transmitted from the engine to the vehicle body structure.

The relationship between the frequency f of vibrations and the force F thus obtained is, when the vibration components damped by the resilient blocks 22, 23 and 26 in the oscillatory system 28 are taken into account, graphically represented by curve $C_f$ in FIG. 7. On the other hand, the relationship between the frequency f of vibrations and the phase $\phi$ of the force F with respect to the displacement x is graphically represented by curve $C_\phi$ in FIG. 8. From the force-frequency characteristic curve $C_f$ shown in FIG. 7, it will be seen that the force F transmitted from the engine 1 to the vehicle body structure has a zero value at a certain frequency level $f_z$ and a resonance value at another frequency level $f_r$. The frequency levels $f_z$ and $f_r$ thus providing the zero value and the resonance value of the force f are respectively expressed as $$f_z = \frac{1}{2\pi} \sqrt{\frac{a \cdot k_1}{\{a \cdot b(1+b) + (1+b)^2\} m}}$$

and $$f_r = \frac{1}{2\pi} \sqrt{\frac{2a \cdot k_1}{\{2(1+b)^2 + a \cdot b^2\} m}}$$

On the other hand, the force transmitted to the vehicle body structure from the engine 1 mounted on the body structure by means of the prior-art engine mounting structure illustrated by a broken line F'. It will thus be seen that the engine mounting structure embodying the present invention is capable of reducing the force F at frequencies lower than a certain threshold frequency level $f_t$ intervening between the zero-force frequency $f_z$ and the resonance frequency $f_r$, as indicated by the area shown hatched in FIG. 7. When the respective values of the parameters a and b, the spring constant $k_1$ of each of the first and second resilient blocks 22 and 23, and the mass m of the inertia member 25 are selected as specified previously, the above mentioned threshold frequency $f_t$ can be determined as 200 Hz from the zero-force and resonance frequencies $f_z$ and $f_r$ respectively calculated from the above equations. If the respective values of the parameters a and b, the spring constant $k_1$ and the mass m are selected so that the threshold frequency $f_t$ becomes approximately 500 Hz, the engine mounting structure embodying the present invention will contribute to reduction of booming noises resulting from the vibrations at frequencies ranging from about 300 Hz to about 400 Hz.

Figure 9:
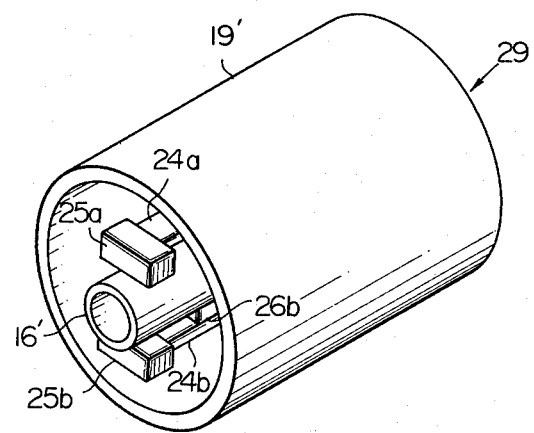
FIG. 9 is a perspective view showing a shock and vibration insulating unit forming part of a second preferred embodiment of the engine mounting structure according to the present invention.
Figure 10:
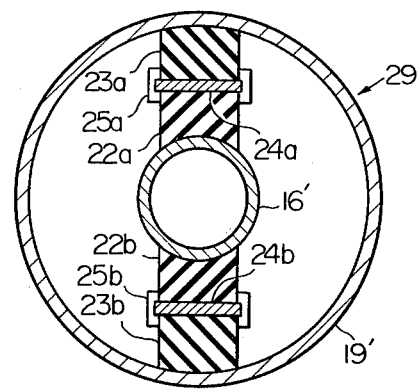
FIG. 10 is a cross sectional view of the shock and vibration insulating unit illustrated in FIG. 9.
Figure 11:
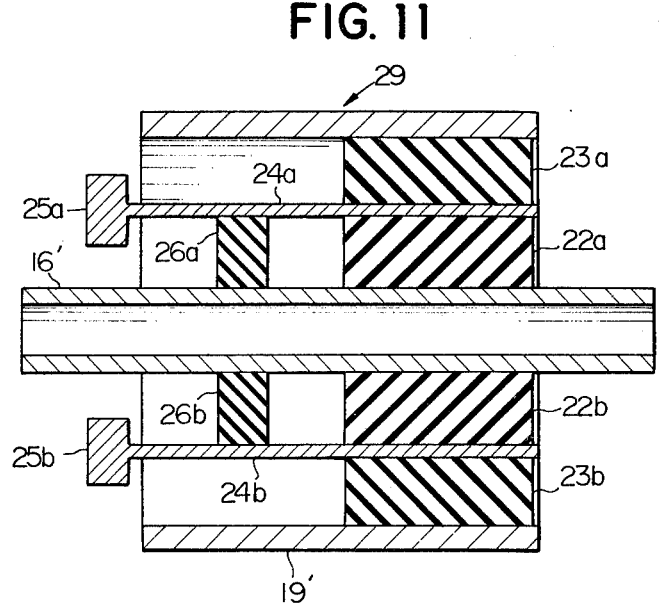
FIG. 11 is a longitudinal sectional view of the shock and vibration insulating unit illustrated in FIGS. 9 and 10.

FIGS. 9 to 11 show a shock and vibration insulating unit 29 forming part of a second preferred embodiment of the engine mounting structure according to the present invention. The engine mounting structure including the shock and vibration insulating unit herein shown is adapted for use with an automotive engine laterally positioned on the body structure of an automotive vehicle with the axis of rotation of the output shaft in a transverse direction of the vehicle body.

Referring concurrently to FIGS. 9 to 11, the shock and vibration insulating unit 29 comprises inner and outer cylindrical hollow members constituting rigid first and second coupling members 16' and 19', respectively. The cylindrical first and second coupling members 16' and 19' are positioned in coaxial relationship and are radially spaced apart from each other. Though not shown in the drawings, the cylindrical first coupling member 16' is securely connected at the opposite axial ends thereof to the body structure of an automotive vehicle, while the cylindrical second coupling member 19' is securely connected to the body structure of the engine positioned laterally of the vehicle body. The coupling members 16' and 19' are positioned with respect to the engine in such a manner as to have their common center axes directed in parallel with the axis of rotation of the output shaft of the laterally positioned engine.

The shock and vibration insulating unit 29 illustrated in FIGS. 9 to 11 further comprises a pair of generally bar-shaped first resilient blocks 22a and 22b and a pair of generally bar-shaped second resilient blocks 23a and 23b. The first resilient blocks 22a and 22b are positioned in diametrically opposite relationship to each other across the inner or first coupling member 16' and are bonded or otherwise securely attached to the outer peripheral surface of the coupling member 16'. On the other hand, the second resilient blocks 23a and 23b are bonded or otherwise securely attached to the inner peripheral surface of the outer or second coupling member 19' and are positioned radially outwardly of the first resilient blocks 22a and 22b, respectively. One first resilient block 22a and one second resilient block 23a have interposed therebetween a rigid intermediate member 24a which has one face bonded or otherwise securely attached to the first resilient block 22a and the other face bonded or otherwise securely attached to the second resilient block 23a. Similarly, the other first and second resilient blocks 22b and 23b have interposed therebetween a rigid intermediate member 24b which has one face bonded or otherwise securely attached to the first resilient block 22b and the other face bonded or securely attached to the second resilient block 23b. Each of the resilient blocks 22a, 22b, 23a and 23b is constructed of a resilient material such as rubber preferably having a predetermined spring constant within the range of between about 30 kgs/mm and about 80 kgs/mm.

The intermediate members 24a and 24b laterally extend from between the first and second resilient blocks 22a and 23a and from between the first and second resilient blocks 22b and 23b and have inertia members 25a and 25b, respectively, at the free ends thereof. Each of the inertia members 25a and 25b may be integral with each of the intermediate members 24a and 24b or may be constructed separately of and securely coupled to each of the intermediate members 24a and 24b. The intermediate members 24a and 24b are connected to one of the first and second coupling members such as the first coupling member 16' by third resilient members 26a and 26b, respectively, as shown in FIG. 11. Each of the third resilient blocks 26a and 26b has a predetermined spring constant which is a times spring constant of each of the first and second resilient blocks 22a, 22b, 23a and 23b, wherein the parameter a is preferably of a value falling within the range of between about 1 and about 10. On the other hand, each of the inertia members 25a and 25b has a predetermined mass which is selected to fall within the range of between 0.1 kg and 1.0 kg. Furthermore, each of the third resilient blocks 26a and 26b is attached to each of the intermediate members 24a and 24b at a point dividing the length of each intermediate member in the ratio 1:b from the end of the intermediate member opposite to each of the inertia members 25a and 25b. In this instance, the parameter b is preferably of a value selected from the range of between about 0.1 and 2.0.

The shock and vibration insulating unit 29 thus constructed and arranged is essentially similar in effect to each of the shock and vibration units 15 and 15' previously described with reference to FIGS. 3 to 5 as will be readily understood.

What is claimed is:

1. An engine mounting structure for mounting an automotive engine on the body structure of an automotice vehicle, comprising at least one shock and vibration insulating unit which comprises:
   a first coupling member to be connected to the body structure of the vehicle;
   a second coupling member to be connected to the body structure of the engine;
   a first resilient block securely attached directly to said first coupling member;
   a second resilient block securely attached directly to said second coupling member;
   each of the first and second resilient blocks being totally solid;
   an intermediate member securely interposed directly between the first and second resilient blocks and extending from between the first and second resilient blocks substantially in parallel with the first and second coupling members, the intermediate member being closely interposed between said first and second resilient blocks throughout its portion intervening between the resilient blocks;
   an inertia member carried on said intermediate member at a free end of the intermediate member; and
   a third resilient block securely interposed between said intermediate member and one of the first and second coupling members and spaced apart substantially in parallel from said one of the first and second resilient blocks.

2. An engine mounting structure as set forth in claim 1, in which said first and second coupling members are hollow and cylindrical and are respectively spaced apart inwardly and outwardly from each other, said first resilient block being securely attached to the outer peripheral surface of the first coupling member, said second resilient block being securely attached to the inner peripheral surface of the second coupling member, said third resilient block being securely interposed between said intermediate member and one of the outer peripheral surface of the first coupling member and the inner peripheral surface of the second coupling member.

3. An engine mounting structure as set forth in claim 2, in which said first resilient block constitutes each of a pair of such resilient blocks positioned in diametrically opposite relationship to each other across said first coupling member and in which said second resilient block constitutes each of a pair of such resilient blocks, wherein each of the resilient blocks each constituting said first resilient block and each of the resilient blocks each constituting said second resilient block have interposed therebetween said intermediate member which constitutes each of such members, said third resilient block constituting each of such blocks.

4. An engine mounting structure as set forth in any one of claims 1 to 3, in which each of said first and second resilient blocks has a spring constant selected from the range of about 30 kgs/mm and about 80 kgs/mm and in which said third resilient block has a spring constant which is about 1 to about 10 times the spring constant of each of said first and second resilient blocks.

5. An engine mounting structure as set forth in any one of claims 1 to 3, in which said third resilient block is attached to said intermediate member at a predetermined point of the intermediate member, said predetermined point dividing the length of the intermediate member in the ratio of 1:b from the end of the intermediate member opposite to said free end thereof, wherein the parameter b is selected from the range of between about 0.1 and about 2.0.

6. An engine mounting structure as set forth in any one of claims 1 to 3, in which said inertia member has a mass falling within the range of between about 0.1 kg and about 1.0 kg on a weight basis.

7. An engine mounting structure as set forth in claim 4, in which said third resilient block is attached to said intermediate member at a predetermined point dividing the length of the intermediate member in the ratio of 1:b from the end of the intermediate member opposite to said free end thereof wherein the parameter b is selected from the range of between about 0.1 and about 2.0, said inertia member having a mass falling within the range of between about 0.1 kg and about 1.0 kg on a weight basis.

* * * * *